(12) United States Patent
Wessels et al.

(10) Patent No.: US 6,898,498 B1
(45) Date of Patent: May 24, 2005

(54) CRASH CLASSIFICATION METHOD AND APPARATUS USING MULTIPLE POINT CRASH SENSING

(75) Inventors: Gerhard F. Wessels, Haan (DE); Shyam V. Potti, Carmel, IN (US); Joseph Thomas Dalum, Hartland, WI (US)

(73) Assignee: Delphi Technologies, Inc., Troy, MI (US)

( * ) Notice: Subject to any disclaimer, the term of this patent is extended or adjusted under 35 U.S.C. 154(b) by 689 days.

(21) Appl. No.: 09/349,214

(22) Filed: Jul. 6, 1999

(51) Int. Cl.$^7$ .............................. G01F 1/00; B60R 21/32
(52) U.S. Cl. ........................ 701/45; 701/47; 180/274; 280/735; 280/801.1
(58) Field of Search .................... 701/45, 46, 47; 180/274; 280/735, 801.1

(56) References Cited

U.S. PATENT DOCUMENTS

| | | | | |
|---|---|---|---|---|
| 4,381,829 A | * | 5/1983 | Montaron | 180/274 |
| 4,928,991 A | * | 5/1990 | Thorn | 280/738 |
| 5,684,701 A | * | 11/1997 | Breed | 701/45 |
| 5,835,873 A | * | 11/1998 | Darby et al. | 701/45 |
| 5,890,085 A | * | 3/1999 | Corrado et al. | 701/47 |
| 5,899,946 A | * | 5/1999 | Iyoda | 701/20 |
| 5,899,949 A | * | 5/1999 | Kincaid | 701/45 |
| 5,900,807 A | * | 5/1999 | Moriyama et al. | 340/436 |
| 6,036,224 A | * | 3/2000 | Wachter et al. | 280/735 |
| 6,036,225 A | * | 3/2000 | Foo et al. | 280/735 |
| 6,052,634 A | * | 4/2000 | Pathe et al. | 701/45 |
| 6,109,647 A | * | 8/2000 | Akaba et al. | 280/733 |
| 6,113,138 A | * | 9/2000 | Hermann et al. | 280/735 |

* cited by examiner

*Primary Examiner*—Thomas G. Black
*Assistant Examiner*—Brian Broadhead
(74) *Attorney, Agent, or Firm*—Stefan V. Chmielewski

(57) ABSTRACT

An improved method of using multiple point crash sensing and multiple sensor occupant position sensing for classifying a crash event and determining which restraints should be deployed. A central controller collects crash data from multiple crash sensors and combines severity characterization data from each of the multiple sensors to construct a characterization table or matrix for the entire system. Each possible crash event classification is represented by a characterization value mask, and the various masks are sequentially applied to the system characterization table until a match is found, with a match identifying the appropriate crash event classification. The classification decision, in turn, is used to determine which, if any, of the restraint devices should be deployed based upon the crash severity. Similarly, the controller collects data from various occupant position sensors to construct a characterization table or matrix for the occupant position detection system. Each possible occupant position sensor classification is represented by a characterization value mask, and various masks are sequentially applied to the table until a match is found, with a match identifying the appropriate occupant position status. The occupant position status, in turn, is used to determine which, if any, of the restraints may be deployed. The system also includes a centrally located crash sensor, and the controller constructs an intrusion table based on differences between the remote and central sensors. The intrusion classification is determined and combined with the crash classification and occupant position status to determine which restraints should ultimately be deployed.

10 Claims, 3 Drawing Sheets

CRASH CLASSIFICATION METHOD AND APPARATUS USING MULTIPLE POINT CRASH SENSING

TECHNICAL FIELD

This invention relates to automotive passenger restraint systems, and more particularly to a method and apparatus for classifying a crash event as to type and severity based upon data obtained from multiple distributed crash sensors.

BACKGROUND OF THE INVENTION

In general, automotive passenger restraint systems perform a number of functions including acceleration sensing, signal processing and analysis, and deployment of one or more restraint devices such as frontal or side air bags and seat belt pretensioners in response to a sensed crash event. Typically, one or more acceleration signals are monitored to detect a potential crash event, and then filtered or integrated over the course of the crash event to produce a velocity change or $\Delta V$ signal. If the $\Delta V$ signal exceeds a threshold, the crash event is determined to be sufficiently severe to warrant deployment of restraints.

As the number and type of restraint devices installed in a given vehicle increases, the controller must obtain more and more information about the crash event so as to only deploy restraint devices appropriate under the circumstances. In certain instances, it may be best to deploy only the passenger side air bags, for example. Various sources have suggested the use of multiple crash sensors, either distributed or centralized, to obtain sufficient information to make the appropriate decision, but what is lacking is a rigorous and universally applicable methodology for analyzing the data and determining the appropriate response.

SUMMARY OF THE INVENTION

The present invention is directed to an improved method and apparatus using multiple point crash sensing and multiple sensor occupant position sensing for simply and reliably classifying a crash event and determining which restraints should be deployed. According to the invention, a central controller collects crash data from multiple distributed crash sensors, either in the form of raw data or pre-characterized indications of severity, and combines severity characterization data from each of the multiple sensors to construct a characterization table or matrix for the entire system. Each possible crash event classification is represented by a characterization value mask, and the various masks are sequentially applied to the system characterization table until a match is found, with a match identifying the appropriate crash event classification. The classification decision, in turn, is used to determine which, if any, of the restraint devices should be deployed based upon the crash severity. Similarly, the controller collects data from various occupant position sensors to construct a characterization table or matrix for the occupant position detection system. Each possible occupant position sensor classification is represented by a characterization value mask, and various masks are sequentially applied to the table until a match is found, with a match identifying the appropriate occupant position status. The occupant position status, in turn, is used to determine which, if any, of the restraints may be deployed. The outputs of both the crash classification function and the occupant position function are combined in a logical AND function to determine which restraints should ultimately be deployed.

In a particularly advantageous embodiment, the system also includes a centrally located crash sensor, and the controller computes a displacement and/or velocity difference between the central crash sensor and some or all of the distributed crash sensors, and characterizes the differences to construct an intrusion table, which may be part of the characterization matrix, or a separate matrix. The intrusion classification is determined and combined with the crash classification to determine which restraints should ultimately be deployed.

DESCRIPTION OF THE PREFERRED EMBODIMENT

Figure 1:
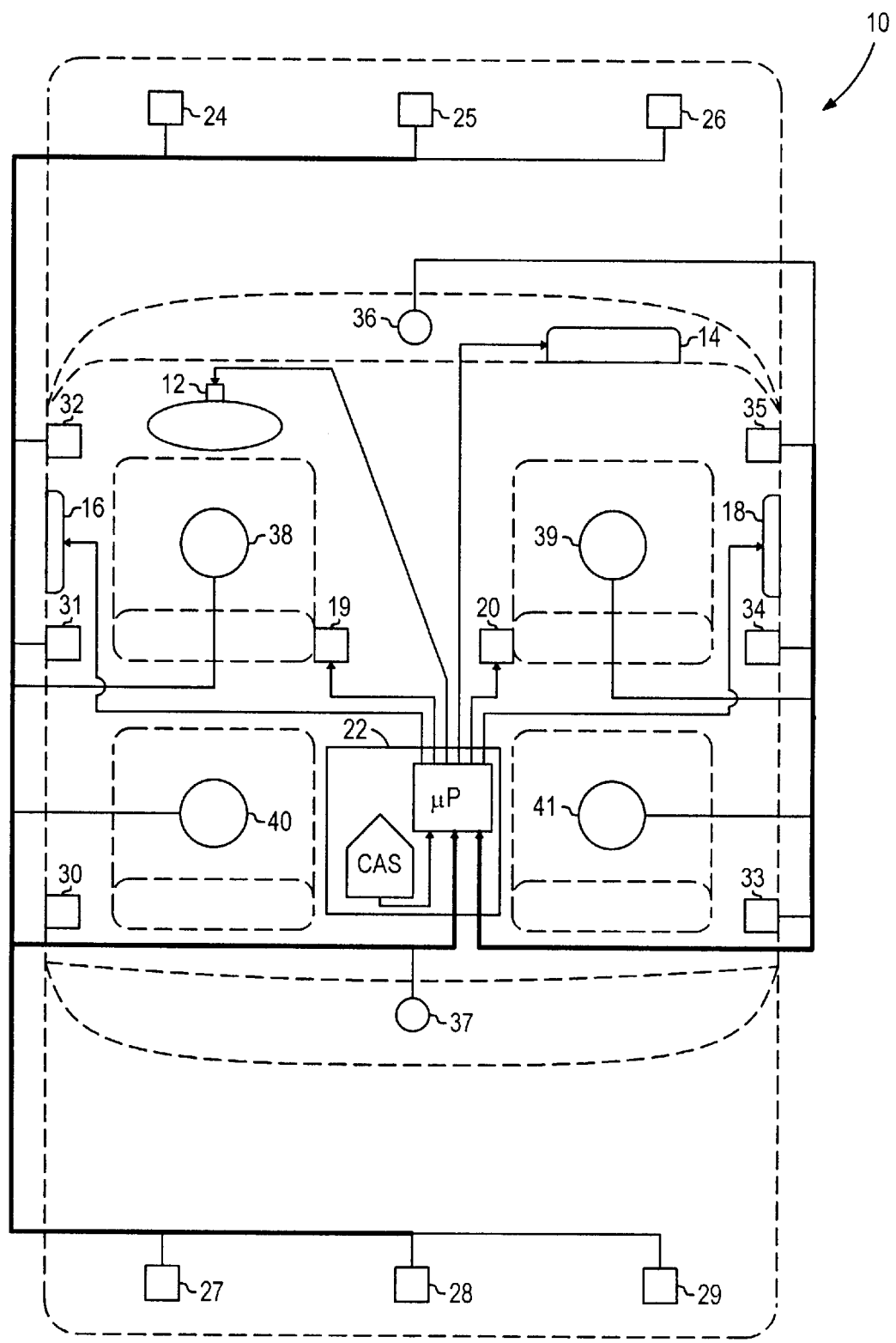
FIG. 1 is a schematic diagram of a multiple point distributed crash sensing system, including a central electronic controller according to this invention.

Referring to FIG. 1, the reference numeral 10 generally designates a vehicle supplemental restraint system including multiple supplemental restraints 12, 14, 16, 18, 19, 20, a centrally located controller 22 having microprocessor uP for deploying one or more of the restraints in a severe crash event to protect the vehicle occupants, and multiple remote or satellite sensors 24–35 located about the periphery of the vehicle for sensing vehicle deceleration and providing corresponding crash data to the microprocessor uP of central controller 22. The restraints may include without limitation, front air bags 12, 14, side restraints 16, 18 and seat belt pretensioners 19, 20. In the illustrated embodiment, it is assumed that the front air bags 12, 14 have low and high energy inflation levels, and that the side restraints 16, 18 include a thorax air bag and a side curtain. Of course, similar restraints may also be provided for the rear seat passengers. Other types of restraints such as inflatable tubular structures, anti-whiplash devices, and structural alteration devices are also possible. In general, however, the restraints 12, 14, 16, 18, 19, 20 are pyrotechnic devices, and the central controller 22 includes firing circuits triggered by the microprocessor uP for deploying the selected restraint(s). The controller 22 is centrally located in the vehicle, and includes a central acceleration sensor CAS. In the illustrated embodiment, the satellite sensors 24–26 detect acceleration at the left-front, center-front and right-front of the vehicle, the satellite sensors 27–29 detect acceleration at the left-rear, center-rear and right-rear of the vehicle, the satellite sensors 30–32 detect acceleration at various points on the driver side of the vehicle, the satellite sensors 33–35 detect acceleration at various points on the passenger side of the vehicle, and the satellite sensors 36–41 detect occupant presence and/or position. The acceleration sensors 24–35 are preferably conventional accelerometers, but other crash related sensors could be used instead; these may include, for example, pressure sensors, mechanical switches, electromechanical sensors, piezo-resistive or magnetostrictive sensors, optical sensors, and anticipatory crash sensors. The occupant sensors 36–41 may take various forms and are designed to detect the presence and/or position of an occupant in a designated seating area; these may include weight sensors (pressure, strain, etc.) mounted in the vehicle seats or seat frame elements, as indicated by the sensors 38–41, and reflected beam sensors (infrared, radar, ultrasonic, etc.) mounted in the headliner or instrument panel, as indicated by the front and rear sensors 36, 37.

The central sensor (CAS) and satellite sensors 24–41 are coupled to the microprocessor uP of controller 22 as shown. The crash sensors 24–35 may be configured to provide either raw or processed crash data. In this connection, raw crash data refers to unfiltered acceleration data, while processed crash data may refer to filtered acceleration data, ΔVelocity data, or another crash severity level indication. In the illustrated embodiment, the sensors CAS and 24–35 include some processing circuitry (which may include a special purpose microprocessor) and provide the central controller microprocessor uP data indicating the detected crash severity level; this may be achieved, for example, by filtering and integrating the acceleration data to form a change in velocity, or ΔV, signal, and comparing the ΔV signal to predefined ΔV thresholds. Alternatively, of course, the filtering, integration and comparison functions could be performed by the central controller microprocessor uP. As explained below, such processing is used to determined which, if any, of the restraints 12, 14, 16, 18, 19, 20 should be deployed based on crash severity. The occupant position sensors likewise may be configured to provide raw or processed occupant data, but preferably include sufficient processing capability to determine the deployment status of each of the restraints 12, 14, 16, 18, 19, 20; that is, whether deployment of a given restraint should be enabled or disabled, based on the detected occupant information. For example, if no occupant is in the passenger seat, the restraints 14, 18, 20 for that seating position should be disabled; if a passenger is present but out of position, certain of the restraints 14, 18, 20 should be disabled, while others should be enabled.

As indicated above, the present invention is directed to a control methodology by which the central controller analyzes the crash data developed by the CAS and the satellite acceleration sensors 24–35, and the occupant position data developed by the occupant sensors 36–41, for purposes of determining which, if any, of the restraints 12, 14, 16, 18, 19, 20 should be deployed. In general, this is achieved according to this invention by using the sensor data to construct characterization tables for the vehicle, and by applying various masks to the tables for the purpose of classifying the crash event and restraint status, and deciding whether one or more of the restraints 12, 14, 16, 18, 19, 20 should be deployed based on the determined classification and status. Three tables are described: a crash classification table based on sensed crash severity, an intrusion table based on sensed intrusion in a crash event, and an occupant classification table based on occupant sensor data. In a preferred embodiment, the classifications determined from the crash classification and intrusion tables are combined in a logical OR function, and the result is combined with a restraint status determined from the occupant classification table in a logical AND function to determine which restraints should be deployed.

A portion of a representative vehicle characterization table for driver side crash data is depicted below. In such case, the relevant data for crash classification is provided by the central sensor CAS and the satellite sensors 30, 31 and 32. Similar tables are also developed for rear collisions (sensors CAS, 27, 28 and 29), front collisions (sensors CAS, 24, 25, 26), and passenger side collisions (sensors CAS, 33, 34 and 35). As shown, the table is based on a severity level (0, 1 or 2) provided by each relevant crash sensor, and contains a crash classification code and an ACTION CODE indicating which restraints should be deployed. The crash classification codes may be arbitrarily assigned and are not shown in the illustrated table, whereas the restraint deployment codes are shown. In the illustrated embodiment, the restraint deployment code contains one bit for each of the six restraints 12, 14, 16, 18, 19, 20 depicted in FIG. 1, with a "0" indicating that the respective restraint should not be deployed, and a "1" indicating that the respective restraint should be deployed, based on the crash sensor data.

| CAS | 32 | 31 | 30 | CRASH CLASSIFICATION CODE | ACTION CODE |
|---|---|---|---|---|---|
| 0 | 0 | 0 | 0 | No Impact | 000000 |
| 0 | 1 | 0 | 0 | A-Pillar Impact, Small Object | 000000 |
| 0 | 0 | 1 | 0 | Door Impact, Small Object | 100000 |
| 0 | 0 | 0 | 1 | C-Pillar Impact, Small Object | 000000 |
| 0 | 1 | 1 | 0 | A-Pillar and Door Impact, Small Object, | 000100 |
| 0 | 1 | 0 | 1 | Multiple Impacts, A and C Pillars, | 100100 |
| 0 | 0 | 1 | 1 | Primary Side Impact at Door and C-Pillar, Medium Object | 100100 |
| 1 | 1 | 1 | 1 | Side Impact, Broad Medium Wt Object, | 101101 |
| 1 | 2 | 1 | 1 | Intrusion at A-Pillar, Medium Size Object, | 111101 |
| 1 | 1 | 2 | 1 | Intrusion at Door, Medium Size Object | 111101 |
| 1 | 1 | 1 | 2 | Intrusion at C-Pillar, Medium Size Object | 101111 |
| 1 | 2 | 2 | 1 | Intrusion at A-Pillar + Door, Broad Object | 111101 |
| 1 | 2 | 1 | 2 | Intrusion from Multiple Impacts or Medium Size Object at A and C Pillars | 111111 |
| 1 | 1 | 2 | 2 | Intrusion from Side Impact at Door and C-Pillar, Broad Object | 111111 |
| 1 | 2 | 2 | 2 | Intrusion from Side Impact, Broad Object, Medium Wt. | 111111 |

Tables of the above type, but representing all different combinations of crash events are combined to form a crash sensor characterization table for the vehicle. In turn, each possible crash event classification is represented by a characterization value mask, and the various masks are sequentially applied to the system characterization table until a match is found, with a match identifying the appropriate crash event classification. The classification and restraint deployment codes, in turn, can be used to trigger deployment of the indicated restraint devices, provided that the status of such restraints permits deployment.

However, in a preferred embodiment, the controller computes a displacement and/or velocity difference ($D_{diff}$ or $V_{diff}$) between the central crash sensor and some or all of the distributed crash sensors, and characterizes the differences to construct an intrusion table for the system. The terms $V_{diff}$ and $D_{diff}$ may be computed as follows:

$$V_{diff} = INT(A_{sat}) - INT(A_{cas}), \text{ and}$$

$$D_{diff} = INT[INT(A_{sat})] - INT[INT(A_{cas})],$$

where INT designates a integration function, $A_{sat}$ is the acceleration detected by a respective satellite acceleration sensor, and $A_{cas}$ is the acceleration detected by the central acceleration sensor CAS. The differential displacement or differential velocity values are categorized for intensity by comparison with predefined thresholds, as in the case of the individual ΔV values discussed above, resulting in table values of 0, 1 or 2 that indicate the level of intrusion for each satellite acceleration sensor location. In the following table, for example, a level 0 indicates a very low differential displacement (or velocity), a level 1 indicates a medium differential displacement (or velocity), and a level 2 indicates a high differential displacement (or velocity). For convenience, the differential term is designated as ΔN, where N is the reference numeral assigned to the respective satellite acceleration sensor.

| Δ32 | Δ31 | Δ30 | INTRUSION CLASSIFICATION | ACTION CODE |
|---|---|---|---|---|
| 0 | 0 | 0 | No Intrusion | 000000 |
| 1 | 0 | 0 | Med. at A-Pillar | 100000 |
| 0 | 1 | 0 | Med. at Door | 100000 |
| 0 | 0 | 1 | Med. at C-Pillar | 000100 |
| 1 | 1 | 0 | Med. at A-Pillar + Door | 100000 |
| 1 | 0 | 1 | Med. at A & C Pillars | 100100 |
| 0 | 1 | 1 | Med. at C-Pillar + Door | 100100 |
| 1 | 1 | 1 | Med. at A & C Pillars + Door | 100100 |
| 2 | 0 | 0 | High at A-Pillar | 110000 |
| 0 | 2 | 0 | High at Door | 110000 |
| 0 | 0 | 2 | High at C-Pillar | 000110 |
| 2 | 2 | 0 | High at A-Pillar + Door | 110000 |
| 2 | 0 | 2 | High at A & C Pillars | 110110 |
| 0 | 2 | 2 | High at C-Pillar + Door | 110110 |
| 2 | 2 | 2 | High at A & C Pillars + Door | 110110 |
| 2 | 1 | 1 | High at A-Pillar, Med. at Door + C-Pillar | 110100 |
| 1 | 2 | 1 | High at Door, Med. at A & C Pillars | 110100 |
| 1 | 1 | 2 | High at C-Pillar, Med. at A-Pillar + Door | 100110 |
| 2 | 2 | 1 | High at A-Pillar + Door, Med. at C-Pillar | 110110 |
| 2 | 1 | 2 | High at A & C Pillar, Med. at Door | 110110 |
| 1 | 2 | 2 | High at Door + C-Pillar, Med. at A-Pillar | 110110 |

Once the crash event classification has been determined, the controller combines the intrusion action code with the crash classification action code in a logical OR operation to form a deployment code based on all of the available crash sensor information. For example, the crash classification and intrusion codes may indicate a broad driver side impact with driver door intrusion. In such a situation, the controller 22 would initiate deployment of more aggressive restraints for the front driver-side seating position (seat belt pretensioner+side curtain+side air bag, for example), than for the rear driver-side seating position (seat belt pretensioner+side air bag, no side curtain, for example). Additionally, the intrusion code can be utilized to control deployment of other counter-measures that reduce structural intrusion; this could include, for example, un-vented inflatable structures for stiffening the door panels, and/or vented inflatable structures for dissipating occupant energy.

A portion of a representative occupant classification table for driver side occupant sensor data follows. In such case, the relevant data for crash classification is provided by the seat sensors 38, 40 and the beam sensors 36, 37. The critical measurements for the driver may include, for example, driver seat belt status, driver seat position, driver distance to steering wheel, driver distance to side door at thorax, and driver distance to side door at head. In the table, these measurements are identified as M1–M5. In each case, the measurement is compared to various threshold levels to determine if the respective restraint should be enabled or disabled. For example, table value for sensor 38 is "0" if the driver seat position is full forward, and "1" if the driver seat position is not full forward. For each combination of occupant sensor values, the table provides a restraint status code (RS Code) indicating whether deployment of a respective restraint is enabled or disabled. In the illustrated embodiment, the restraint status code contains five bits, two for the respective frontal air bag (low and high energy), two for the respective side restraint (thorax bag and side curtain), and one for the driver seat pretensioner 19, with a "0" indicating that deployment of the respective restraint is disabled, and a "1" indicating that deployment of the respective restraint is enabled, based on the occupant sensor data. Thus, a RS Code of 10111, for example, indicates that the high energy stage of the driver air bag 12 is disabled, but the other restraints (low energy stage, driver seat pretensioner, driver side curtain, driver thorax air bag) are enabled. Referring to the table, this code is generated when the driver seat belt is buckled, the driver seat is full forward, the driver distance from the steering wheel exceed a threshold (such as 120 mm), and the driver thorax and head are in position.

| M1 | M2 | M3 | M4 | M5 | RS CODE |
|---|---|---|---|---|---|
| 1 | 0 | 1 | 1 | 1 | 10111 |

Figure 2A:
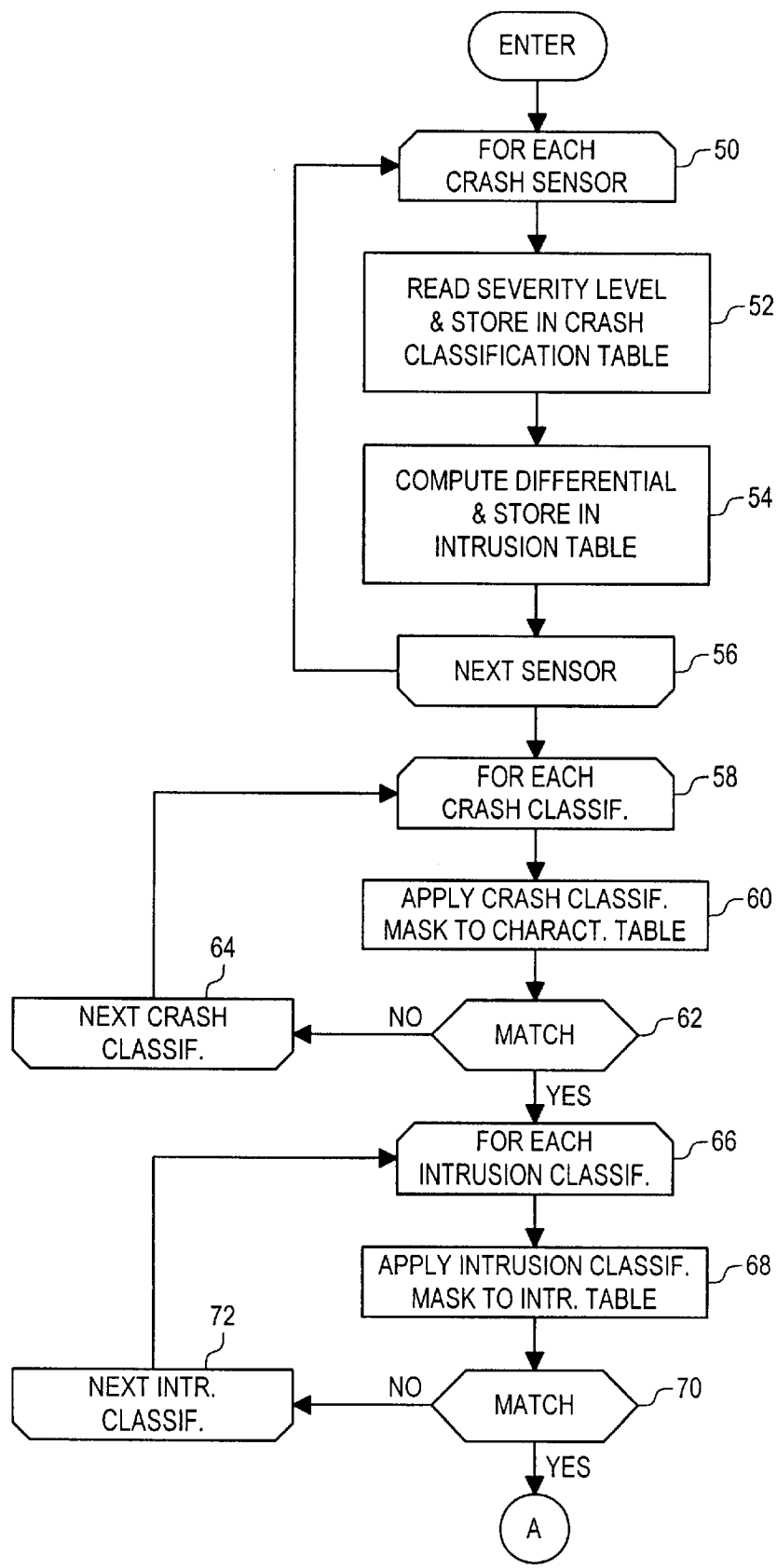
FIGS. 2A and 2B together depict a flow diagram representative of computer program instructions executed by the electronic controller of FIG. 1 for classifying a crash event and determining which, if any, restraints should be deployed according to this invention.
Figure 2B:
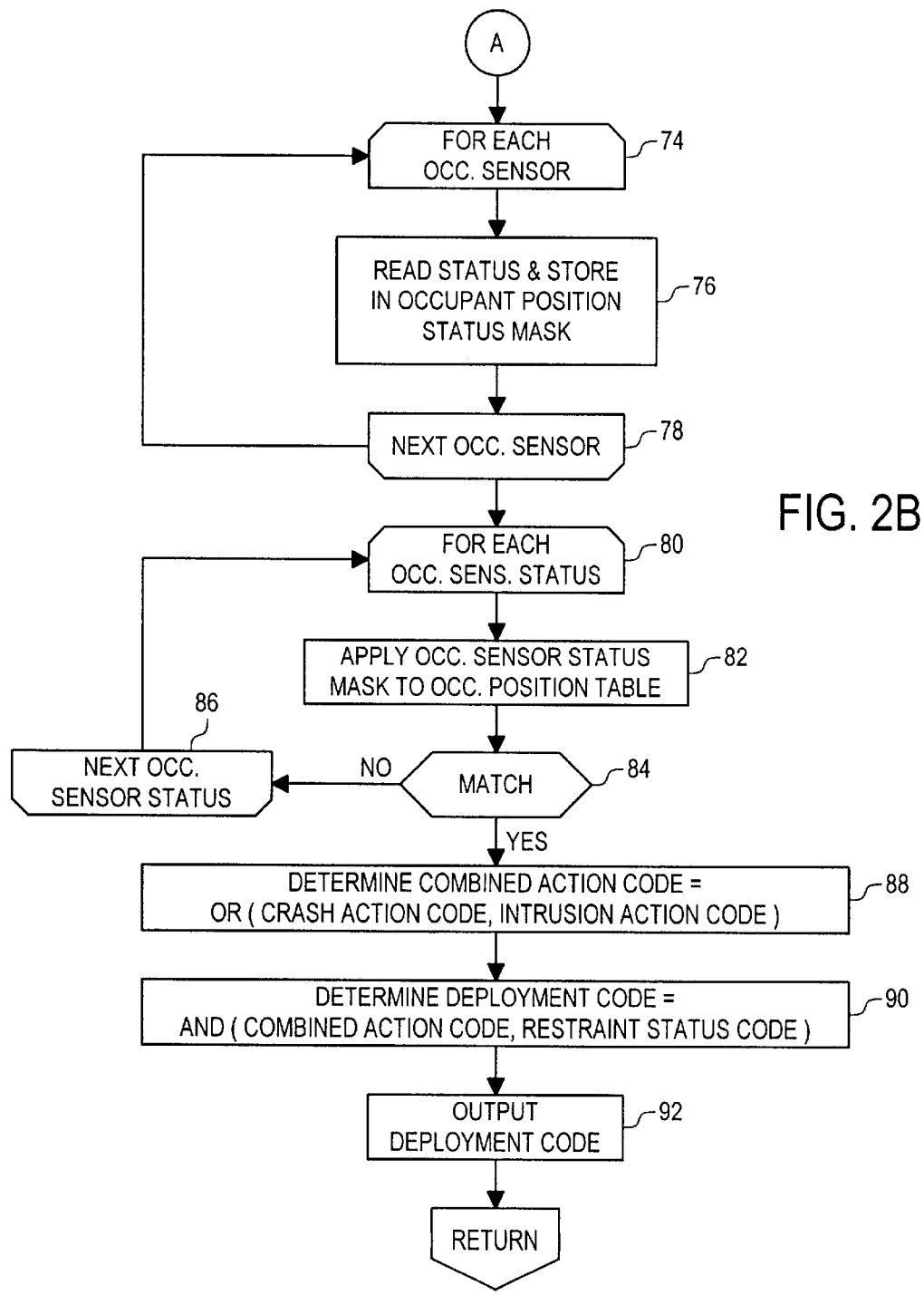

FIGS. 2A–2B depict a flow diagram representative of computer program instructions executed by the controller 22 of FIG. 1 in carrying out the classification method of this invention. The classification method is part of a larger overall deployment control algorithm, and provides outputs to the algorithm indicative of the crash and intrusion classifications, and the appropriate action to be taken. The blocks 50–56 comprise a table building loop, with blocks 50 and 56 bounding the loop. For each sensor, block 52 reads the severity level (0, 1 or 2 in the illustrated embodiment) and stores it in the system crash classification table, and block 54 computes the differential displacement (or velocity) between that sensor and the central sensor, determines a table value (level 0, 1 or 2) and stores it in the intrusion table.

Once the crash classification and intrusion classification tables are fully constructed, the controller executes a crash classification loop (FIG. 2A) comprising the blocks 58–64, with the blocks 58 and 64 bounding the loop. Each of the crash classifications is defined by a mask, and each such mask is applied in turn to the characterization table, as indicated at block 60, until a match is detected at block 62. Once the crash classification has been determined, the controller executes an intrusion classification loop comprising the blocks 66–72, with blocks 66 and 72 bounding the loop. As with the crash classifications, each intrusion classification is defined by a mask, and each such mask is applied in turn to the intrusion table, as indicated at block 68, until a match is detected at block 70.

The controller then constructs an occupant position table, and executes an occupant position classification loop (FIG. 2B). The blocks 74–78 comprise the table building loop, with blocks 74 and 78 bounding the loop. For each occupant position sensor, block 76 reads the restraint status (enable/disable) and stores it in the occupant position status table. The occupant position classification loop comprises the blocks 80–86, with blocks 80 and 86 bounding the loop. As with the crash and intrusion classifications, each occupant position classification is defined by a mask, and each such mask is applied in turn to the occupant position table, as indicated at block 82, until a match is detected at block 84.

The blocks 88 and 90 are executed to logically combined the determined classifications. The action codes determined from the crash classification and intrusion tables are combined in a logical OR operation at block 88 to form a combined action code. For example, if the action code from the crash classification code is 001010, and the action code from the intrusion table is 001110, the combined action code determined at block 88 is 001110. At block 90, the combined action code is combined with the restraint status code in a logical AND operation to form a deployment code that indicates which restraints are to be deployed. For example, if the combined action code is 001110 as in the above example, and the restraint code is 101111, the deployment code is 001110, where only the restraints associated with a logic 1 are to be deployed. Finally, the block 92 outputs the deployment code, concluding the classification routine.

In summary, the classification method of this invention provides a simple and reliable technique for classifying a crash event and determining which restraints should be deployed. While described in reference to the illustrated embodiment, it is expected that various modifications in addition to those suggested herein will occur to those skilled in the art. In this regard, it will be understood that this invention is not limited to the illustrated embodiment, and that deployment methods incorporating such modifications may fall within the scope of this invention, which is defined by the appended claims.

What is claimed is:

1. In a vehicle supplemental restraint system including a plurality of remote crash sensors for providing localized crash severity measurements to a central controller, and a plurality of restraints selectively deployed by the central controller for protection of the vehicle occupants, the improvement wherein said central controller processes the localized crash severity measurements provided by said plurality of remote crash sensors and determines which of said plurality of restraints to deploy by:

(a) storing a crash classification mask for each of a plurality of crash classifications, each such mask comprising a set of predetermined remote crash sensor values characteristic of the respective crash classification and a restraint deployment code identifying which of the restraints should be deployed for the respective crash classification;

(b) collecting crash severity measurements from the remote crash sensors in the course of a crash event, and storing such measurements in a crash characterization table;

(c) consecutively applying said crash classification masks to said crash characterization table, and in the event of a match between the predetermined values of a given crash classification mask and the sensor measurements stored in said crash characterization table, identifying a restraint deployment code from such given crash classification mask; and (d) analyzing the identified restraint deployment code to determine which of said plurality of restraints to deploy.

2. The improvement of claim 1, wherein the crash severity measurements are categorized into different crash severity levels, which the controller stores in said crash characterization table.

3. The improvement of claim 1, wherein the vehicle supplemental restraint system includes a plurality of occupant sensors for providing vehicle occupant measurements to the central controller, and wherein said central controller processes the vehicle occupant measurements provided by said plurality of occupant sensors and determines which of said plurality of restraints to deploy by:

(a) storing an occupant classification mask for each of a plurality of occupant classifications, each such mask comprising a set of predetermined occupant sensor values characteristic of the respective occupant classification and a restraint status code identifying which of the restraints could potentially be deployed for the respective occupant classification;

(b) collecting vehicle occupant measurements from the occupant sensors in the course of a crash event, and storing such measurements in an occupant characterization table;

(c) consecutively applying said occupant classification masks to said occupant characterization table, and in the event of a match between the predetermined values of a given occupant classification mask and the sensor measurements stored in said occupant characterization table, identifying a restraint status code from such given occupant classification mask; and (d) combining the identified restraint deployment code and the identified restraint status code to determine which of said plurality of restraints to deploy.

4. The improvement of claim 3, wherein the controller determines which of said plurality of restraints to deploy by combining the identified restraint deployment code and the identified restraint status code with a logical AND operation.

5. The improvement of claim 1, wherein the vehicle supplemental restraint system includes a central crash sensor for measuring crash severity in a central portion of said vehicle, and providing such measured crash severity to the central controller, and wherein said central controller processes the crash severity measured by said central crash sensor and determines which of said plurality of restraints to deploy by:

(a) computing intrusion indications for each of said remote crash sensors based on the respective severity measurements and the measured crash severity provided by said central crash sensor, and stores such intrusion indications in an intrusion characterization table;

(b) storing an intrusion classification mask for each of a plurality of intrusion classifications, each such mask comprising a set of predetermined intrusion indications characteristic of the respective intrusion classification and an intrusion deployment code identifying which of the restraints should be deployed for the respective intrusion classification;

(c) consecutively applying said intrusion classification masks to said intrusion characterization table, and in the event of a match between the predetermined intrusion indications of a given intrusion classification mask and the intrusion indications stored in said intrusion characterization table, identifying an intrusion deployment code from such given intrusion classification mask; and (d) combining the identified restraint deployment code and the identified intrusion deployment code to determine which of said plurality of restraints to deploy.

6. The improvement of claim 5, wherein the controller determines which of said plurality of restraints to deploy by combining the identified restraint deployment code and the identified intrusion deployment code with a logical OR operation.

7. The improvement of claim 5, wherein the controller computes a first change in velocity indication based on the localized crash severity measurement provided by a respective remote crash sensor, and a second change in velocity indication based on the crash severity measurement provided by said central crash sensor, and computes said intrusion indication for said respective remote crash sensor according to a difference between said first and second change in velocity indications.

8. The improvement of claim 5, wherein the controller computes a first charge in displacement indication based on the localized crash severity measurement provided by a respective remote crash sensor, and a second change in displacement indication based on the crash severity measurement provided by said central crash sensor, and computes said intrusion indication for said respective remote crash sensor according to a difference between said first and second change in displacement indications.

9. The improvement of claim 5, wherein the vehicle supplemental restraint system includes a plurality of occupant sensors for providing vehicle occupant measurements to the central controller, and wherein said central controller processes the vehicle occupant measurements provided by said plurality of occupant sensors and determines which of said plurality of restraints to deploy by:

(a) storing an occupant classification mask for each of a plurality of occupant classifications, each such mask comprising a set of predetermined occupant sensor values characteristic of the respective occupant classification and a restraint status code identifying which of the restraints could potentially be deployed for the respective occupant classification;

(b) collecting vehicle occupant measurements from the occupant sensors in the course of a crash event, and storing such measurements in an occupant characterization table;

(c) consecutively applying said occupant classification masks to said occupant characterization table, and in the event of a match between the predetermined values of a given occupant classification mask and the sensor measurements stored in said occupant characterization table, identifying a restraint status code from such given occupant classification mask; and (d) combining the identified restraint deployment code, the identified intrusion deployment code and the identified restraint status code to determine which of said plurality of restraints to deploy.

10. The improvement of claim 9, wherein the controller determines which of said plurality of restraints to deploy by combining the identified restraint deployment code and the identified intrusion deployment code with a logical OR operation to form a combined deployment code, and then combining the combined deployment code and the identified restraint status code with a logical AND operation.

* * * * *